(12) United States Patent
Fetzmann et al.

(10) Patent No.: US 7,817,065 B2
(45) Date of Patent: Oct. 19, 2010

(54) AIRPORT VIEWING SYSTEM FOR AN AIRCRAFT

(75) Inventors: Fabien Fetzmann, Cugnaux (FR); Pierre Coldefy, Toulouse (FR); Thierry Malaval, Toulouse (FR)

(73) Assignee: Airbus France, Toulouse (FR)

( * ) Notice: Subject to any disclaimer, the term of this patent is extended or adjusted under 35 U.S.C. 154(b) by 295 days.

(21) Appl. No.: 11/995,199

(22) PCT Filed: Jul. 13, 2006

(86) PCT No.: PCT/FR2006/001713

§ 371 (c)(1),
(2), (4) Date: Jan. 9, 2008

(87) PCT Pub. No.: WO2007/010121

PCT Pub. Date: Jan. 25, 2007

(65) Prior Publication Data
US 2008/0211692 A1    Sep. 4, 2008

(30) Foreign Application Priority Data
Jul. 22, 2005    (FR) .................................. 05 07802

(51) Int. Cl.
*G01C 23/00*    (2006.01)
(52) U.S. Cl. .................... 340/972; 340/971; 340/979; 340/980; 345/418; 345/619; 345/660; 345/661; 342/357.01; 342/357.08; 342/357.11; 342/357.13; 342/407; 701/120; 701/201; 701/208; 701/210; 701/212; 710/5

(58) Field of Classification Search ................. 340/971, 340/972, 961, 979, 980, 985, 990; 701/120, 701/212, 122, 201, 208, 210; 342/407, 357.01–357.17; 345/660, 418, 619, 661; 710/5
See application file for complete search history.

(56) References Cited

U.S. PATENT DOCUMENTS
6,112,141 A    8/2000    Briffe
(Continued)

FOREIGN PATENT DOCUMENTS
EP    1 347 412    9/2003
(Continued)

OTHER PUBLICATIONS
International Search Report dated Jan. 23, 2007.
(Continued)

*Primary Examiner*—George A Bugg
*Assistant Examiner*—Sisay Yacob
(74) *Attorney, Agent, or Firm*—Dickinson Wright PLLC

(57) ABSTRACT

The invention relates to a system with a device for determining the current position of the aircraft, a display device displaying, on a viewing screen an airport map, wherewith is associated a symbol illustrating the current position of the aircraft, an interface device enabling the display of the display device to be operated by an operator, a storage device storing a plurality of airport maps, a device for determining a reference point for each airport, whereof the map is stored in the storage device, and a selecting device which selects an airport map stored in the storage device so as to transmit same to the display device so that it can be displayed, and which comprises a device enabling an airport map to be automatically selected, based on the current position of the aircraft and as airport reference point.

15 Claims, 1 Drawing Sheet

U.S. PATENT DOCUMENTS

| | | | | |
|---|---|---|---|---|
| 6,411,890 | B1* | 6/2002 | Zimmerman | 701/120 |
| 6,731,226 | B2* | 5/2004 | Walter | 340/972 |
| 7,382,284 | B1* | 6/2008 | Armstrong et al. | 340/958 |
| 2003/0179215 | A1 | 9/2003 | Coldefy | |
| 2004/0201596 | A1* | 10/2004 | Coldefy et al. | 345/660 |

FOREIGN PATENT DOCUMENTS

| | | |
|---|---|---|
| WO | 03/071228 | 8/2003 |
| WO | 2005-033631 | 4/2005 |

OTHER PUBLICATIONS

J. Schiefele, et al., "Human Factors Flight Trial analysis for 2D Situation Awareness and 3D Synthetic Vision displays," 22nd DASC, Digital Avionics Systems Conference Proceedings, Oct. 12-16, 2003, IEEE, US, vol. 2 of 2, Conf. 9, Oct. 12, 2003, pp. 9C11-9C114.

S. Kamineni, et al., "Electronic Moving Map of Airport Surface on Electronic Flight Bag," Digital Avionics Systems Conference, 2004, DASC 04, the 23rd, Oct. 24-28, 2004, IEEE, US, vol. 1, Oct. 24, 2004, pp. 4C3-41.

\* cited by examiner

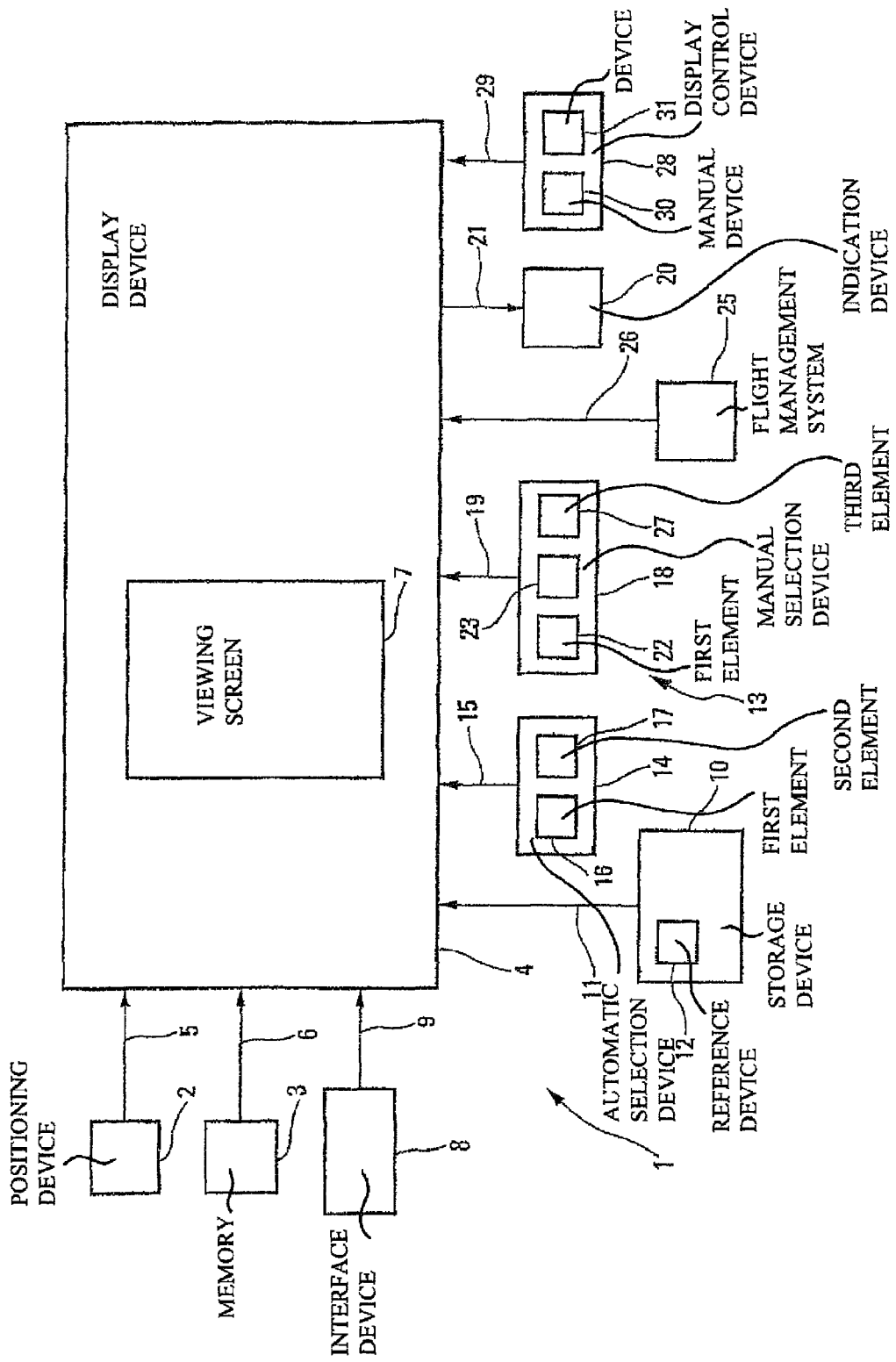

AIRPORT VIEWING SYSTEM FOR AN AIRCRAFT

TECHNICAL FIELD OF THE INVENTION

The present invention relates to an airport viewing system which is installed in an aircraft, in particular a transport aircraft.

BACKGROUND OF THE INVENTION

Although not exclusively, such an airport viewing system is more particularly intended for assisting the navigation of an aircraft on the ground of an airport, in the context of an airport navigation function. It is known that such an airport navigation function makes it possible, in particular, to display on a screen in the cockpit of the aircraft an airport map upon which is indicated, in particular, the current position of said aircraft.

Generally, such an airport viewing system comprises at least:
- a first means for determining the current position of the aircraft;
- a memory for recording at least one airport map;
- a display device which is able to present, on at least one viewing screen, at least partially an airport map with which can be associated a symbol illustrating said current position of the aircraft; and
- an interface means allowing an operator to operate on the display used by said display device.

Such an airport viewing system has several disadvantages.

Firstly, the memory of said system is not capable of recording all of the maps of the various airports which are likely to be of interest to the pilot (or more generally to the crew of the aircraft) during a flight. In fact, it is known that, during a single flight, the crew is generally called upon to display various airports and, in particular, the departure airport and the destination airport and possibly also a diversion airport or any other airport for which the crew would need to have information.

Secondly, the crew must manually select each time, using said interface means, the map which is appropriate to the current situation. Such a manual selection represents a large workload since, depending on the flight phase and in particular during the approach to a new airport, the crew must select the appropriate airport map each time. Moreover, as said airport viewing system can present only one single airport map at a time, when the crew needs information on an airport other than the one which corresponds to the current situation and which is displayed, it is obliged to replace that displayed airport map with the new map in which it is interested, such that it thus loses the information relating to the airport associated with the current position of the aircraft.

SUMMARY OF THE INVENTION

The present invention relates to an airport viewing system which is installed in an aircraft, in particular a transport aircraft, and which makes it possible to overcome said disadvantages.

For this purpose, according to the invention, said system comprising:
- a first means for determining the current position of the aircraft;
- a memory for recording at least one airport map;
- a display device which is able to present, on at least one viewing screen, at least partially, an airport map with which can be associated a symbol illustrating said current position of the aircraft; and
- an interface means allowing an operator to operate on the display used by said display device, is noteworthy in that it furthermore comprises:
- at least one storage means able to store a plurality of airport maps;
- a second means associated with said storage means and making it possible to determine a reference point for each airport whose map is stored in said storage means; and
- a selection device making it possible to select an airport map stored in said storage means in order to transmit it to said display device so that it can display it, said selection device comprising at least automatic selection means making it possible to select automatically an airport map to be displayed, according to the current position of the aircraft and at least one airport reference is point.

Thus, due to the invention, the airport viewing system can take account (in the storage means) of all of the airport maps that are available and which could be useful to the crew during a flight.

Moreover, said selection device carries out an automatic selection of the airport most appropriate to the current situation, as described below. Thus, the crew has, without taking any action, the availability of the airport map which matches the current position of the aircraft and therefore the current flight phase.

In a particular embodiment, said display device is produced in such a way as to be able to display a first type of display mode, in which said symbol illustrating said current position of the aircraft is fixed on the viewing screen and said airport map is mobile, and said automatic selection means comprise a first element which automatically selects an airport map, according to the current position of the aircraft and at least one coverage volume which is defined around an airport reference point. More precisely, said display device is produced in such a way as to be able to display, as a display mode of the first type:
- a mode called "arc", for which said fixed symbol is situated at the bottom of the viewing screen and several arcs of circle are centered with respect to said symbol; or
- a mode called "rose", for which said fixed symbol is situated at the center of the viewing screen and several circles are centered on that symbol.

Advantageously, said first element (of said automatic selection means) is produced in such a way as to optimize said coverage volume, as a function of the maximum scale of the display device and of the proximity of the airports. Thus, the system according to the invention (automatically) selects an airport map, at the time the latter can be viewed according to the maximum scale of the display device, whilst avoiding the situations where the coverage volumes mutually overlap.

Moreover, in a particular embodiment, said display device is produced in such a way as to be able to display a display mode of a second type, called "plan" mode, for which the aircraft map is fixed on the viewing screen and the symbol illustrating the current position of the aircraft is mobile, and said automatic selection means comprise a second element which automatically selects an airport map, as a function of a current distance between the current position of the aircraft and an airport reference point; this current distance being compared with at least one predetermined distance. In this case, when the aircraft has left an origin airport, said second element (of said automatic selection means):

determines the current distance between the current position of the aircraft and the reference point of said origin airport;

compares this current distance with a first predetermined distance; and automatically selects as an airport map:
  that of the origin airport, as long as said current distance remains less than or equal to said first distance; and
  that of a destination airport, as soon as said current distance becomes greater than said first distance.

Moreover, advantageously, when the aircraft is approaching a destination airport, said second element (of said automatic selection means):

determines the current distance between the current position of the aircraft and the reference point of said destination airport;

compares this current distance with a second predetermined distance; and automatically selects as an airport map:
  that of the airport which is selected initially, as long as said current distance remains greater than or equal to said second distance; and
  that of said destination airport, as soon as said current distance becomes less than said second distance.

Of course, in order that the pilot may remain in control of the display and may always impose the display of an airport map of interest to him, said selection device furthermore comprises manual selection means allowing an operator to select an airport map manually.

Thus, the crew retains the possibility of selecting at any time the airport map of interest to it. Moreover, the manual selection carried out by a crew member retains priority. However, when a crew member selects, using said manual selection means, an airport which is different from the destination airport which was selected previously by said automatic selection means, appropriate means which form part of the system according to the invention are activated to indicate this selection inconsistency.

In a particular embodiment, said airport maps are stored in said storage means according to at least one arranged list, and said manual selection means comprise at least a first element allowing an operator, in order to make the selection, to choose one of said airport maps in said arranged list.

Moreover, in another embodiment, said airport maps which are stored in said storage means are respectively associated with particular descriptive features, and said manual selection means comprise at least a second element allowing an operator, in order to make the selection, to enter alphanumeric characters making it possible to form one of said descriptive features associated with said airport maps.

Moreover, advantageously, said manual selection means are produced in such a way as to remain active when said display device displays a display mode of a first type (an arc mode or a rose mode), for which the symbol illustrating said current position of the aircraft is fixed on the viewing screen and the airport map is mobile. Thus, the crew retains the ability to consult, in arc mode or in rose mode, the information on the various available airports, other than the displayed one, since in these modes the system displays an airport map depending on the position of the aircraft with respect to the coverage volume of each airport.

Moreover, in a particular embodiment, the airport viewing system according to the invention comprises linking means making it possible to connect it to a flight management system, preferably of the FMS ("Flight management System") type, and said manual selection means comprise at least a third element for selecting and retrieving data relating to airports from said flight management system, in order to provide assistance in the selection of airport maps.

In the context of the present invention, the selection of an airport map does not correspond to the display of that airport map on the display device, but to the transmission of that airport map to said display device in order that it can display it (immediately or subsequently) as soon as such a display is required.

In order to do this, the airport viewing system according to the invention furthermore comprises display control means which control the display, on the viewing screen of the display device, of an airport map which was previously selected (or of information relating to an airport map which was previously selected).

Advantageously, said display control means comprise:
  at least one manual means; and/or
  at least one means automatically controlling the display, and doing this at the time of a change of display mode (arc, rose, plan) of the display device.

BRIEF DESCRIPTION OF THE DRAWINGS

The single FIGURE of the appended drawing will give a good understanding of how the invention may be embodied. This single FIGURE is the block diagram of an airport viewing system according to the invention.

DETAILED DESCRIPTION OF THE INVENTION

The system 1 according to the invention, and shown as a block diagram in the FIGURE, is installed in an aircraft, which is not shown, for example a transport aircraft, and is intended for viewing at least one part of an airport. Although not exclusively, such an airport viewing system 1 is more particularly intended for assisting in the navigation of an aircraft on the ground of an airport, in the context of an airport navigation function. It is known that such an airport navigation function makes it possible, in particular, to display on a screen in the cockpit of the aircraft an airport map upon which is, in particular, indicated the current position of said aircraft.

Said system 1 is of the usual type, comprising:
  a usual means 2, for determining the current geographic position of the aircraft, in flight or on the ground;
  a usual memory 3, for recording at least one airport map. In general this memory 3, which has a limited is capacity, essentially records the airports involved in the flight in progress, namely the origin and destination airports in particular;
  a display device 4 which is connected by the intermediary of links 5 and 6 to said means 2 and to said memory 3, and which is able to show on at least one viewing screen 7, at least partially, an airport map and, on that airport map, a symbol illustrating the aircraft and situated on said aircraft map in accordance with the actual current position of said aircraft on or with respect to said airport; and
  a usual interface means 8, which is connected by the intermediary of a link 9 to said display device 4, which comprises, for example, a keyboard and/or a computer mouse (not shown) and which allows an operator, in particular a crew member, to operate on the display used by said display device 4. Using said interface means 8, an operator can, in particular, modify the scale of the display, modify the display mode and move the displayed airport map.

According to the invention, said system 1 furthermore comprises:
- at least one storage means 10 which is connected by the intermediary of a link 11 to said display device 4 and which is able to store a plurality of airport maps. This storage means 10 can, in particular, comprise one or more storage elements which are integrated in usual systems of the aircraft;
- a means 12 associated with said storage means 10 and making it possible to determine for each airport, whose map is stored in said storages means 10, a reference point which will be taken into account in the way described below; and
- a selection device 13 which makes it possible to select an airport map which is stored in said storage means 10 in order to transmit it to said display device 4 so that it can display it. In the context of the present invention, the selection of an airport map does not signify the display of that airport map on the viewings screen 7 but the transmission of that airport map to said display device 4 in order that it can display it if such a display is required (subsequently or simultaneously).

According to the invention, said selection device 13 at least comprises automatic selection means 14 which are connected by a link 15 to said display device 4 and which are produced in such a way as to select automatically an airport map to be displayed and to do this according to the current position of the aircraft and to at least one airport reference point, as described below.

Thus, due to the invention, the airport viewing system 1 can take into account (in the storage means 10) all of the airport maps that are available and which could be useful to the crew during a flight.

Moreover, said selection device 13 makes it possible to carry out (using the means 14) an automatic selection of the airport that is the most appropriate to the current situation, as described below. Thus, the crew has the availability, without taking any action, of the airport map which is matched to the current position of the aircraft and therefore to the current flight phase.

Said display device 4 is produced in such away as to be able to display a display mode of a first type, for which said symbol illustrating the current position of the aircraft is fixed on the viewing screen 7 whilst said airport map is mobile on that viewing screen 7. More precisely, the display device 4 is produced in such a way as to be able to display, as a display mode of the first type:
- a mode called "arc", for which said fixed symbol is situated at the bottom of the viewing screen 7 and several arcs of circle are centered with respect to said symbol; or
- a mode called "rose", for which said fixed symbol is situated in the center of the viewing screen 7 and several circles are centered on that symbol.

In this case, said automatic selection means 14 comprise an element 16 which automatically selects an airport map, according to the current position of the aircraft, and at least one coverage volume which is defined, in the usual manner, around the corresponding airport reference point (or Aerodrome Reference Point).

Thus, by a comparison between the current position of the aircraft and the coverage volume which is defined for each airport, the element 16 determines the airport to be selected. In this way, as soon as the pilot chooses a display mode which is centered on the aircraft, that is to say a mode of said first type (arc mode or rose mode), the map of that airport is automatically selected if the aircraft is located within the corresponding coverage volume.

Moreover, said element 16 (of said automatic selection means 14) is produced in such a way as to optimize said coverage volume, as a function of the maximum scale of the display device 4 and of the proximity of the various airports. Thus, the system 1 according to the invention automatically carries out the selection of an airport map, at the time when the latter can be viewed according to the maximum scale of the display device 4, whilst avoiding situations in which the coverage volumes mutually overlap.

Moreover, in a particular embodiment, said display device 4 is produced in such a way as to be able to display a display mode of the second type, the type called "plan", in which the airport map is fixed on the viewing screen 7 and the symbol illustrating the current position of the aircraft is mobile on that viewing screen 7. In plan mode, the display is therefore no longer centered on the current position of the aircraft such that the pilot can:
- freely move the displayed airport map;
- request the display of another airport map and move it freely in order to consult the information that it contains.

According to the invention, in this case, said automatic selection means 14 comprise an element 17 which automatically selects an airport map, according to the current distance between the current position of the aircraft and an airport reference point, this current distance then being compared with at least one predetermined distance as described below.

In this case, when the aircraft has left an origin airport, said element 17 (of said automatic selection means 14) carries out, automatically and repetitively, the following sequence of operations:
- it determines the current distance Dc1 between the current position of the aircraft and the reference point of said origin airport;
- it compares this current distance Dc1 with a predetermined distance D1, for example 50 NM (about 92 kilometers); and
- it automatically selects as an airport map:
  - that of said origin airport, as long as the current distance Dc1 remains less than or equal to said distance D1; and
  - that of the destination airport, as soon as said current distance Dc1 becomes greater than said distance D1, that is, to say as soon as the aircraft is sufficiently far from said origin airport.

Moreover, when the aircraft approaches a destination airport, said element 17 (of said automatic selection means 14) carries out, repetitively and automatically, the following sequence of operations:
- it determines the current distance Dc2 between the current position of the aircraft and the reference point of said destination airport;
- it compares this current distance Dc2 with a predetermined distance D2, for example 50 NM (about 92 kilometers); and
- it automatically selects as the airport map:
  - that of the airport which is initially selected, as long as said current distance Dc2 remains greater than or equal to said distance D2; and
  - that of said destination airport, as soon as said current distance Dc2 becomes less than said distance Dc2, that is to say as soon as the aircraft is close to said destination airport.

The distances D1 and D2 can also be expressed according to the flight phases of the aircraft.

In order that the pilot may remain in control of the display and can always impose the display of an airport map of interest to him, said selection device 13 of course also comprises manual selection means 18 allowing an operator to select an airport map manually.

Thus, the crew retains the possibility of selecting at any time the airport map of interest to it, using said manual selection means 18. Moreover, the manual selection carried out by a crew member retains priority with respect to an automatic selection carried out by said automatic selection means 14. However, in the case of inconsistency between a manual selection carried out using said manual selection means 18 and an automatic selection carried out previously by said automatic selection means 14, in particular during an approach to a destination airport, the system 1 according to the invention indicates this inconsistency to the crew, using a warning means 20 which is connected by the intermediary of a link 21 to said display device 4. The indication produced by this warning means 20 can be a sound indication and/or a visual indication. This warning means 20 is in particular advantageous when there appears, during an approach phase, an inconsistency between an airport currently displayed in plan mode and the destination airport, because it is generally recommended not to be in plan mode in the approach phase and, in addition, whilst viewing an airport that is different from that upon which a landing is being prepared. The indications provided by the warning means 20 are of course transmitted as soon as an inconsistency is detected.

In a particular embodiment, said airport maps are stored in said storage means 10 according to at least one alphabetically and numerically arranged list. As a same airport can, in general, be denoted according to at least three different usual names (complete name, OACI code, IATA code), said manual selection means 18 have different classifications in order to carry out the selection from that list, namely:
- classification by the complete name of the airport;
- classification by OACI ("Organisation de l'Aviation Civile Internationale"—International Civil Aviation Organisation) code; and
- classification by IATA ("International Air Transport Association") code.

For this purpose, said manual selection means 18 comprise an element 22 allowing an operator, in particular a crew member, in order to carry out the selection, to choose one of said airport maps from said arranged list. The crew of the aircraft therefore has the possibility at any time of choosing one of said three classifications which is then displayed on a screen for example. The element 22, for example a computer mouse, makes it possible to move in the chosen and displayed classification in order to select an airport map.

Moreover, in another embodiment, said airport maps which are stored in said storage means 10 are respectively associated with particular descriptive features, and said manual selection means 18 comprise at least one element 23, for example a keyboard, allowing an operator, in order to carry out the selection, to enter alphanumeric characters in such a way as to form one of said descriptive features associated with an airport map.

Moreover, said manual selection means 18 are produced in such a way as to remain active when said display device 4 is displaying a display mode of said first type (an arc mode or a rose mode), for which the symbol illustrating said current position of the aircraft is fixed on the viewing screen 7 and the airport map is mobile. Thus, the crew retains the ability, in arc mode or in rose mode, to consult the information on the various available airports, other than the one displayed, since in these modes (arc or rose) the system 1 displays an airport map depending on the position of the aircraft with respect to the coverage volume of each airport.

This makes it possible to consult the information on different airports without removing or modifying the map being viewed. In order to provide a return of consistent information, the information relating to an airport selected from said list is, for example, displayed on the viewing screen 7:
- in yellow, if that airport is not the one which is currently being displayed; and
- in green, if that airport is the airport actually being displayed at the current time.

Moreover, in a particular embodiment, said airport viewing system 1 according to the invention furthermore comprises linking means 26 making it possible to connect it to a flight management system 25, preferably of the FMS ("Flight Management System") type. Said flight management system 25 does not contain any airport maps but contains a database of geographic points, certain of which represent the positions of airports. When programming the flight plan, the pilot chooses the geographic points corresponding to the departure airport and to the destination airport. The system 1 according to the invention retrieves, via the linking means 26, this information from said flight management system 25. Moreover, said system 1 comprises an element 27 (forming part of the manual selection means 18) which provides shortcuts for loading the corresponding airport maps.

As mentioned previously, the selection of an airport map using the selection device 13 does not signify that this airport map is displayed on the viewing screen 7 but it signifies that this airport map is transmitted to said display device 4 in order that it can display it when a corresponding instruction is given to it.

Thus, in order to do this, the airport viewing system 1 according to the invention furthermore comprises display control means 28 which control the display, on the viewing screen 7 of the display device 4, of an airport map which has previously been selected (or of information relating to an airport map which has previously been selected).

In a particular embodiment, said display control means 28 which are connected by the intermediary of a link 29 to said display device 4 comprise:
- at least one manual means 30, for example a push-button; and/or
- at least one means 31 automatically controlling the display, and doing this preferably when there is a change of display mode (arc, rose, plan) of the display device 4.

The invention claimed is:

1. An airport viewing system which is installed in an aircraft, comprising:
   - a positioning device that determines the current position of the aircraft;
   - a memory that records at least one airport map;
   - a display device configured to present, on at least one viewing screen, at least partially, an airport map with which can be associated a symbol illustrating said current position of the aircraft;
   - an interface device configured to allow an operator to operate on the display used by said display device;
   - at least one storage device that stores a plurality of airport maps;
   - a selection device that stores an airport map stored in said storage device in order to transmit it to said display device so that it can display it, said selection device comprising at least an automatic selection device to select automatically an airport map to be displayed, according to at least the current position of the aircraft; and
   - reference device associated with said storage device, that determines a reference point for each airport whose map is stored in said storage device, and a coverage volume which is defined around said reference point, wherein said display device is produced to display a first type of display mode, in which said symbol illustrating said current position of the aircraft is fixed on the viewing screen and said airport map is mobile, and wherein said automatic selection device comprise a first element which automatically selects an airport map, according to the current position of the aircraft and a coverage volume of an airport, wherein said first element of said automatic selection device optimizes said coverage volume, as a function of the maximum scale of the display device and of the proximity of the airports.

2. The system as claimed in claim 1, wherein said display device a display mode of a second type, called plan mode, for which the aircraft map is fixed on the viewing screen and the symbol illustrating the current position of the aircraft is mobile, and said automatic selection device comprise comprises a second element which automatically selects an airport map, as a function of a current distance between the current position of the aircraft and an airport reference point, the current distance being compared with at least one predetermined distance.

3. The system as claimed claim 2, wherein, when the aircraft has left an origin airport, said second element:
   determines the current distance between the current position of the aircraft and the reference point of said origin airport;
   compares the current distance with a first predetermined distance; and
   automatically selects as an airport map:
   of the origin airport, as long as said current distance remains less than or equal to said first distance; and
   of a destination airport, as soon as said current distance becomes greater than said first distance.

4. The system as claimed in claim 2, wherein, when the aircraft is approaching a destination airport, said second element:
   determines the current distance between the current position of the aircraft and the reference point of said destination airport;
   compares the current distance with a second predetermined distance; and
   automatically selects as an airport map:
   of the airport which is selected initially, as long as said current distance remains greater than or equal to said second distance; and
   of said destination airport, as soon as said current distance becomes less than said second distance.

5. The system as claimed in claim 1, wherein said selection device further comprises a manual selection device allowing an operator to select an airport map manually.

6. The system as claimed in claim 4, further comprising an indication device that indicates to an operator an inconsistency when the operator selects, using said manual selection device an airport which is different from the destination airport which was selected previously by said automatic selection device.

7. The system as claimed in claim 5, wherein said airport maps are stored in said storage device according to at least one arranged list, and said manual selection device comprises at least a first element allowing an operator, in order to make the selection, to choose one of said airport maps in said arranged list.

8. The system as claimed in claim 5, wherein said airport maps which are stored in said storage device are respectively associated with particular descriptive features, and said manual selection device comprises at least a second element (configured to enable an operator, in order to make the selection, to enter alphanumeric characters making it possible to form one of said descriptive features associated with said airport maps.

9. The system as claimed in claim 5, wherein said manual selection device remains active when said display device displays a display mode of a first type, for which the symbol illustrating said current position of the aircraft is fixed on the viewing screen and the airport map is mobile.

10. The system as claimed in claim 5, further comprising a linking device that connects said system to a flight management system and said manual selection device comprises at least a third element to select and retrieve data relating to airports from said flight management system.

11. The system as claimed in claim 1, further comprising a display control device to control the display, on the viewing screen of the display device, directly of a previously selected airport map or of information relating to a previously selected airport map.

12. The system as claimed in claim 11, wherein said display control comprise device comprises at least one manual device.

13. The system as claimed in claim 11, wherein said display control device comprises at least one device automatically controlling the display when there is a change of display mode of the display device.

14. An aircraft, comprising an airport viewing system as claimed in claim 1.

15. The system as claimed in claim 1, wherein, when the aircraft is approaching a destination airport, said second element:
   determines the current distance between the current position of the aircraft and the reference point of said destination airport;
   compares the current distance with a second predetermined distance; and
   automatically selects as an airport map:
   of the airport which is selected initially, as long as said current distance remains greater than or equal to said second distance; and
   of said destination airport, as soon as said current distance becomes less than said second distance;
   wherein said selection device comprises a manual selection device allowing an operator to select an airport map manually; and
   an indicator device to indicate to an operator an inconsistency when the operator selects, using said manual selection device an airport which is different from the destination airport which was selected previously by said automatic selection device.

* * * * *